United States Patent
Moreira et al.

(10) Patent No.: US 11,621,994 B2
(45) Date of Patent: Apr. 4, 2023

(54) BROKERING SERVERS BASED ON REMOTE ACCESS PERFORMANCE

(71) Applicant: HEWLETT-PACKARD DEVELOPMENT COMPANY, L.P., Spring, TX (US)

(72) Inventors: Fabio Osorio Moreira, Houston, TX (US); Diogo Cesa Rosa, Houston, TX (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 91 days.

(21) Appl. No.: 16/482,273

(22) PCT Filed: Jan. 8, 2018

(86) PCT No.: PCT/US2018/012776
§ 371 (c)(1),
(2) Date: Jul. 31, 2019

(87) PCT Pub. No.: WO2019/135773
PCT Pub. Date: Jul. 11, 2019

(65) Prior Publication Data
US 2020/0382621 A1    Dec. 3, 2020

(51) Int. Cl.
*H04L 67/01*      (2022.01)
*G06F 9/451*     (2018.01)
*H04L 67/562*   (2022.01)
*H04L 67/1001* (2022.01)

(52) U.S. Cl.
CPC .............. *H04L 67/01* (2022.05); *G06F 9/452* (2018.02); *H04L 67/1001* (2022.05); *H04L 67/562* (2022.05)

(58) Field of Classification Search
CPC . H04L 67/42; H04L 67/2809; H04L 67/1002; G06F 9/452
See application file for complete search history.

(56) References Cited

U.S. PATENT DOCUMENTS 6,691,259 B1 * 2/2004 Mackey .............. G06F 11/3419
                                                                        714/E11.195
8,150,971 B2 * 4/2012 Lublin .................... G06F 15/16
                                                                        709/226

(Continued)

FOREIGN PATENT DOCUMENTS

WO    WO-2014153649 A1    10/2014
WO    WO-2017046780 A1    3/2017

*Primary Examiner* — Patrice L Winder
*Assistant Examiner* — Angela M Widhalm De Rodriguez
(74) *Attorney, Agent, or Firm* — Knobbe, Martens, Olson & Bear, LLP

(57) ABSTRACT

Examples of a method for brokering remote servers are described herein. In some examples, performance data is received from a plurality of remote servers, where the performance data indicates rendering performance of a foreground application executed by at least one of the remote servers and streamed from at least one of the remote servers over a remote desktop connection. An indication of a selected application is received from a client. The client is directed to at least one of the remote servers based on the performance data and the selected application.

9 Claims, 8 Drawing Sheets

(56) References Cited

U.S. PATENT DOCUMENTS

| | | | |
|---|---|---|---|
| 8,219,653 B1* | 7/2012 | Keagy | G06F 8/63 718/1 |
| 8,316,101 B2 | 11/2012 | Ammerlaan et al. | |
| 8,335,703 B1* | 12/2012 | Pulier | H04L 47/822 705/7.11 |
| 8,738,972 B1* | 5/2014 | Bakman | G06F 11/3442 714/47.1 |
| 8,838,769 B2 | 9/2014 | Binyamin | |
| 8,902,248 B1* | 12/2014 | Bidarkar | G09G 5/02 345/619 |
| 9,208,461 B2 | 12/2015 | Busa | |
| 9,336,117 B2 | 5/2016 | Agrawal et al. | |
| 9,354,960 B2 | 5/2016 | Suit | |
| 9,485,290 B1 | 11/2016 | Kolomeitsev et al. | |
| 9,704,270 B1* | 7/2017 | Main | G06T 15/60 |
| 9,979,674 B1* | 5/2018 | Kumar | H04L 67/1031 |
| 10,037,232 B1* | 7/2018 | Garcia | G06F 11/3476 |
| 10,089,130 B2* | 10/2018 | Kim | G06F 9/452 |
| 10,230,601 B1* | 3/2019 | Qin | H04L 43/045 |
| 2002/0065922 A1* | 5/2002 | Shastri | H04L 65/80 709/227 |
| 2007/0143762 A1 | 6/2007 | Arnold et al. | |
| 2007/0198656 A1 | 8/2007 | Mazzaferri et al. | |
| 2008/0069011 A1* | 3/2008 | Sekaran | H04L 65/4038 370/260 |
| 2010/0107155 A1* | 4/2010 | Banerjee | G06F 8/60 717/177 |
| 2010/0262650 A1* | 10/2010 | Chauhan | H04L 67/26 709/203 |
| 2011/0251992 A1* | 10/2011 | Bethlehem | H04L 67/306 707/610 |
| 2012/0089980 A1* | 4/2012 | Sharp | G06F 9/45558 718/1 |
| 2012/0113270 A1* | 5/2012 | Spracklen | H04R 27/00 348/194 |
| 2012/0317274 A1* | 12/2012 | Richter | H04L 67/1097 709/224 |
| 2013/0067469 A1* | 3/2013 | Das | G06F 9/5077 718/1 |
| 2014/0032644 A1* | 1/2014 | Saxena | G06F 9/5055 709/203 |
| 2014/0258872 A1* | 9/2014 | Spracklen | H04L 41/5009 715/736 |
| 2014/0325054 A1* | 10/2014 | Agrawal | G06F 11/3409 709/224 |
| 2015/0120807 A1 | 4/2015 | Bharadwaj | |
| 2015/0188990 A1* | 7/2015 | Kacmarcik | H04L 67/16 709/203 |
| 2015/0244596 A1* | 8/2015 | Abuelsaad | H04L 67/10 709/224 |
| 2016/0173619 A1* | 6/2016 | Singleton, IV | H04L 67/42 709/203 |
| 2016/0224898 A1* | 8/2016 | Ryckbosch | G06N 20/00 |
| 2017/0111457 A1* | 4/2017 | Rivera | H04L 67/142 |
| 2017/0178046 A1* | 6/2017 | Chakraborty | G06Q 10/06393 |
| 2018/0343186 A1* | 11/2018 | Milanese | G06F 11/3419 |
| 2019/0081942 A1* | 3/2019 | Suresh | G06F 9/452 |

* cited by examiner

BROKERING SERVERS BASED ON REMOTE ACCESS PERFORMANCE

BACKGROUND

Computers are used to perform a variety of tasks, including work activities, banking, research, and entertainment. Networking technology may enable computers to communicate. For example, computers may send and/or receive information via a network. In this way, information may be shared and/or communicated between computers.

DETAILED DESCRIPTION

Figure 1:
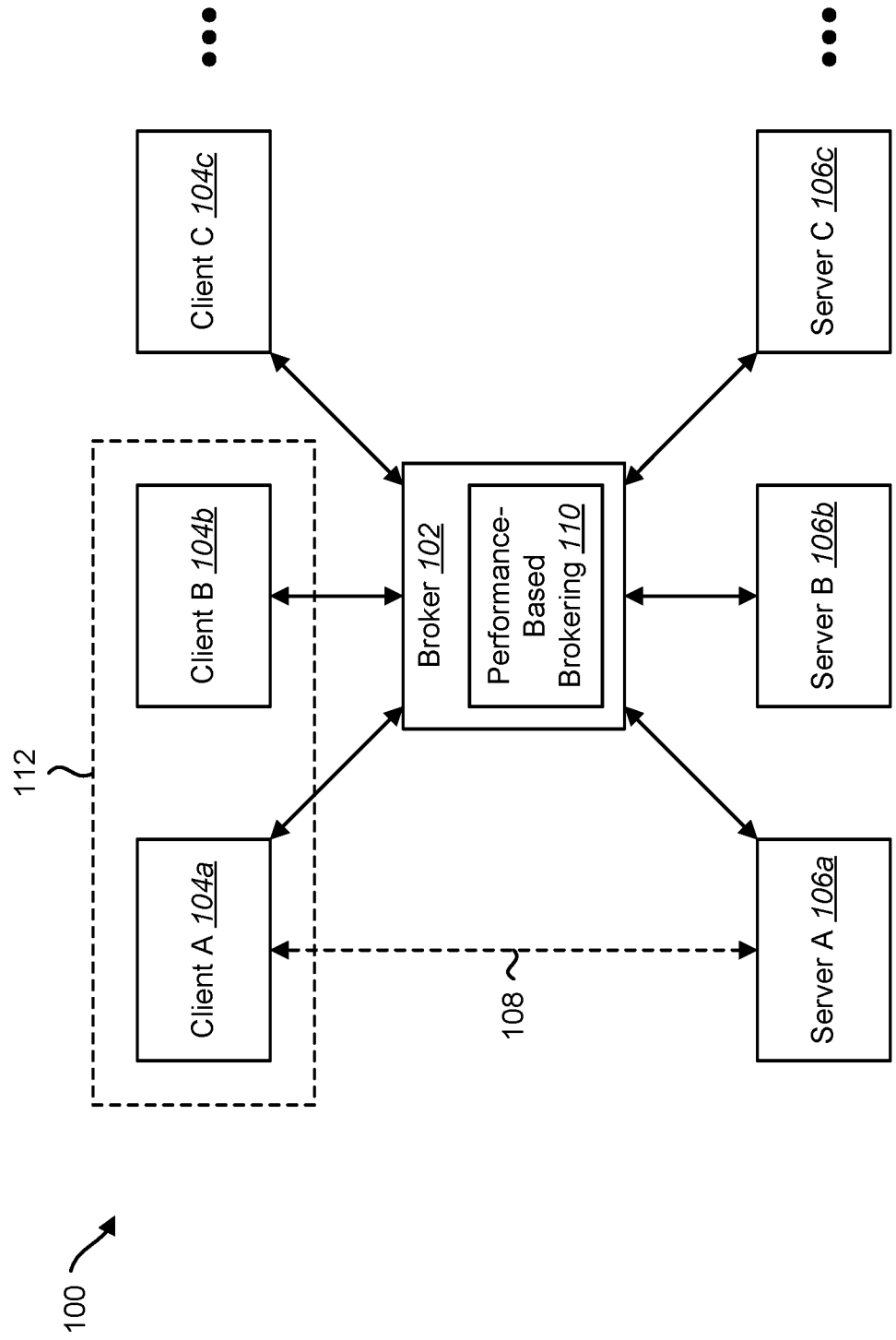
FIG. 1 is a block diagram of an example of a system in which brokering servers based on remote access performance may be performed.

Computing devices may operate in a variety of roles. For example, a server may be a computing device that serves a client computing device. In particular, a client may connect to a server and may send requests to the server. The server may respond to the requests by performing an operation and/or sending data to the client. "Remote access" includes procedures and/or protocols for a client to remotely access server resources (e.g., data, files, processing resources, applications, and/or programs, etc.). In some examples, a client may remotely access a server through remote desktop. For instance, remote desktop may include approaches that enable a client to interact with the server remotely while providing the client with a view of the desktop on the server. The term "remote" and variations thereof mean separate or distant. For example, a "remote server" is a server that is located remotely from a client and/or that is communicated with over a connection (e.g., network connection, wired connection, and/or wireless connection).

In some examples, a server may share a view of the desktop on the server using a video stream. A client may connect to the server and receive the video steam. The client may send input (e.g., user input) to the server to control server functions.

In some scenarios, multiple servers may be available for remote desktop. A broker may be a computing device that acts as an intermediary between a client and servers. In some examples, a client may connect to the broker. The broker may know whether any of the servers are available. The broker may enable (e.g., set up) remote desktop between a client and a server. For instance, the broker may set up and/or manage a remote desktop connection between a client and a server. In some examples, the broker may allow the client to select a server for remote desktop.

Some approaches for providing remote access may provide limited information for selecting a server. For example, some approaches may provide static information associated with servers such as operational system, hostname, and power state. This may cause a user difficulty in selecting a server, particularly if a user does not know beforehand which server will be suitable. This may lead to poor server utilization if a demanding application is run on an under-performing remote server. Or, a client may connect to a server that does not have an intended application installed. In order to ameliorate these problems, a broker may be implemented to provide performance-based brokering.

Various examples are described with reference to the Figures, where similar reference numbers may indicate functionally similar elements. When an item (e.g., structure and/or operation) is described without a reference number, this may refer to the item generally, with and/or without reference to the Figures. The structures and operations as generally described and illustrated in the Figures herein may be arranged and designed in a wide variety of different configurations. Thus, the examples represented in the Figures are not intended to limit scope, as claimed, but are representative of the subject matter described herein.

FIG. 1 is a block diagram of an example of a system 100 in which brokering servers based on remote access performance may be performed. Specifically, the system 100 may include client(s) 104a-c, server(s) 106a-c, and a broker 102. The client(s) 104a-c, broker 102, and/or server(s) 106a-c may be computing devices. Each of the client(s) 104a-c, broker 102, and/or server(s) 106a-c may include a processor, memory, and/or executable instructions for performing operations. Examples of computing devices may include desktop computers, laptop computers, tablet devices, smart phones, cellular phones, game consoles, server devices, and/or smart appliances, etc. In some implementations, the client(s) 104ac, broker 102, and/or server(s) 106a-c may include and/or be coupled to a display for presenting information (e.g., images, text, graphical user interfaces (GUIs), etc.). It should be noted that while three clients 104a-c are illustrated in FIG. 1 specifically, a different number of clients 104a-c may be included in the system 100. Additionally or alternatively, while three servers 106a-c are illustrated in FIG. 1 specifically, a different number of servers 106a-c may be included in the system 100.

The server(s) 106a-c may provide functionality and/or data to the client(s) 104a-c. For example, the server(s) 106a-c may execute application(s) (e.g., programs and/or instruction sets, etc.) for the client(s) 104a-c. Examples of applications may include word processing applications, image processing applications, simulation applications, rendering applications, entertainment applications, drafting applications, automation applications, monitoring applications, etc. The servers 106a-c may include the same application(s) in some instances, or may include different application(s) in some instances. In some examples, two or more servers 106a-c may be housed in a particular area or building (e.g., data center, company offices, etc.). The server(s) 106a-c may enable remote desktop functionality. For example, each server 106a-c may include hardware (e.g., circuitry and/or processor(s), etc.) and/or machine-executable instructions (e.g., program(s), code, and/or application(s), etc.) for providing a remote desktop. For instance, each of the server(s) 106a-c may be capable of streaming video of a desktop and/or of an application. Additionally or alternatively, each of the server(s) 106a-c may be capable of receiving input (e.g., remote user input) for operating an application.

A "desktop" includes a graphical user interface that provides an interface to an application (e.g., program) and/or data (e.g., files). In some examples, a desktop may present windows, icons, interactive controls (e.g., buttons, text boxes, lists, links, radio buttons, etc.), and/or images, etc., that enable interaction with a computing device (e.g., a server). For instance, a desktop may present windows and/or controls for interacting with applications. "Remote desktop" denotes remote access to a desktop. For example, client A 104a may remotely access the desktop of server A 106a via a remote desktop connection 108.

A "remote desktop connection" is a communication connection that carries remote desktop data. For example, the remote desktop connection 108 may carry a video stream of a desktop from server A 106a to client A 104a and/or may carry input (e.g., user input, commands, events, data, interface device movement, cursor location, "clicks," and/or "taps," etc.) from client A 104a to server A 106a. A remote desktop connection may be established using a protocol (e.g., Internet protocol (IP), transmission control protocol (TCP), real-time streaming protocol (RTSP), real-time transport protocol (RTP), real-time transport control protocol (RTCP), user datagram protocol (UDP), and/or remote desktop protocol (RDP), etc.). In some examples, a remote desktop connection may be established and/or carried through the broker 102. For example, the broker 102 may perform authentication (e.g., obtain and check user credentials) and manage (e.g., route, direct, and/or monitor, etc.) the remote desktop connection 108. In some approaches, a remote desktop connection may be carried independent of the broker 102. For example, the broker 102 may perform authentication (e.g., obtain and check user credentials) and provide information (e.g., addresses, authentication keys, etc.) to client A 104a and/or server A 104a to carry the remote desktop connection 108 separately from the broker 102.

The client(s) 104a-c may enable remote desktop functionality. For example, each client 104a-c may include hardware (e.g., circuitry and/or processor(s), etc.) and/or machine-executable instructions (e.g., program(s), code, and/or application(s), etc.) for accessing a remote desktop. For instance, the clients 104a-c may receive video of a remote desktop and/or may send input (e.g., user input) to the servers 106a-c for controlling applications being executed by the servers 106a-c.

The client(s) 104a-c may connect to the server(s) 106a-c remotely. In some examples, the client(s) 104a-c may connect to the broker 102 and/or to the server(s) 106a-c via a network. Examples of networks may include wide area networks (WANs) (e.g., the Internet), local area networks (LANs), metropolitan area networks (MANs), and/or personal area networks (PANs), etc. Networks may be implemented using wired technology (e.g., Ethernet, Data Over Cable Service Interface Specification (DOCSIS), synchronous optical networking (SONET), and/or synchronous digital hierarchy (SDH), etc.) and/or wireless technology (e.g., Institute of Electrical and Electronics Engineers (IEEE) 802.11 (Wi-Fi), IEEE 802.15 (WiMAX), Bluetooth, ZigBee, near-field communication (NFC), and/or Long-Term Evolution (LTE), etc.).

A network may include at least one device. For example, a network may include computing devices, routers, switches, gateways, access points, and/or modems (not shown in FIG. 1).

In some examples, a network may include (e.g., may be partitioned into, may be subdivided into, etc.) subnets. For instance, a network may include a number of devices with a range of addresses (e.g., IP addresses). Subsets (e.g., sub-ranges) of the addresses may correspond to subsets of the devices within subnets. In the example illustrated in FIG. 1, client A 104a and client B 104b may be included in a subnet 112. It should be noted that subnets may or may not overlap.

The broker 102 may act as an intermediary between the client(s) 104a-c and the server(s) 106a-c. For example, the broker 102 may check user credentials when a client (e.g., client A 104a) requests a connection. In some examples, the broker 102 may perform other tasks (e.g., traffic filtering, security, and/or monitoring, etc.). In some approaches, the broker 102 may direct (e.g., assign) one of the clients 104a-c (e.g., users) to one of the servers 106a-c for remote desktop access. This direction (e.g., assignment) may be automatic in some examples. For instance, the broker 102 may automatically select a server for a client. Alternatively, this direction may be manual. For instance, the broker 102 may allow a client to indicate a selected server (based on user input, for example).

As described above, some approaches for providing remote access (e.g., remote desktop) may provide limited information for manually selecting a server. This may cause a user difficulty in selecting a remote server and/or may lead to poor remote server utilization.

In some examples, the broker 102 may implement performance-based brokering 110. For instance, the broker 102 may include hardware (e.g., circuitry and/or processor(s), etc.) and/or machine-executable instructions to perform performance-based brokering 110. Performance-based brokering 110 may include receiving performance data from the servers 106a-c. The performance data may include at least one performance metric of at least one application that is executed by the server(s) 106a-c and provided via remote desktop. In some examples, the performance data may indicate a performance metric (e.g., rendering performance and/or frame rate) of an application.

In some approaches, performance data may include client identifier(s), server identifier(s) (e.g., remote server identifier(s)), subnet identifier(s), and/or application identifier(s). For example, a performance metric may be associated with a client identifier (e.g., client IP address and/or computer name, etc.), a server identifier (e.g., server IP address and/or computer name), and/or a subnet identifier (e.g., subnet number). In some examples, the client identifier may be utilized also as a subnet identifier. For instance, a client IP address may also indicate a subnet of a client. In some examples, a client, a server, and/or a broker may add an identifier to the performance data. For example, client A 104a may send performance data with an IP address of client A 104a. In another example, server A 106a may add the IP address of client A 104a and/or the IP address of server A 106a to performance data from client A 104a. In yet another example, the broker 102 may add a server identifier of server A 106a to performance data received from server A 106a. Other variations are possible.

In some approaches, the performance data (e.g., performance metric, rendering performance, and/or frame rate) may correspond to a foreground application. A "foreground application" is an application that has focus and/or is active on a computing device. For example, applications may be presented in windows. A current working window, a "frontmost" window, a "topmost" window, or a window with a top Z-order may correspond to a foreground application. Non-foreground applications may correspond to windows that are lower in the Z-order or that fall behind the window for the foreground application.

In some approaches, each client 104a-c may measure remote desktop performance (e.g., rendering performance, frame rate, etc.) to produce performance data. Each client 104a-c may send performance data to one of the servers 106a-c that is providing a remote desktop to a corresponding client 104a-c. Each of the servers 106a-c may send the performance data to the broker 102.

For clarity, an example regarding client A 104a and server A 106a is given as follows. In this example, client A 104a may determine a frame rate of a remote desktop video stream. For instance, client A 104a may measure how frequently frames for the remote desktop video stream are being rendered by obtaining rendering information from hardware (e.g., processor(s), central processing unit (CPU), and/or graphics processing unit (GPU), etc.) and/or from a program (e.g., operating system (OS), video rendering program, and/or remote desktop client application, etc.) running on client A 104a. Client A 104a may send the performance data (e.g., performance metric(s), rendering performance, and/or frame rate, etc.) to server A 106a, which is providing remote desktop to client A 104a.

As used herein, "rendering" includes at least one operation for generating and/or presenting an image. For example, rendering may include converting data into viewable pixels on a display. "Rendering performance" is an indication of rendering quality. For example, "rendering performance" may be quantified with a metric or metrics (e.g., frame rate, resolution, pixel output rate, and/or error rate, etc.) that indicate rendering quality. In the context of remote access and/or remote desktop, rendering performance may be impacted by factors such as server hardware, server load, network connection, and/or client hardware, etc. For instance, a server may generate video frames, format (e.g., packetize and/or encode, etc.) the video frames, and stream the video frames over a network connection to a client. The client may receive the stream, de-format (e.g., unpack and/or decode, etc.) the video frames, and/or present the video frames on a display. Accordingly, performance metric(s) may indicate end-to-end rendering performance as output at a client in some implementations. It should be noted that a "stream" includes a sequence of data (e.g., a series of video frames, a sequence of packets, serial data, etc.).

Server A 106a may add to the performance data in some approaches. For example, server A 106a may determine a foreground application corresponding to the performance data. For instance, server A 106a may associate an application executed in the foreground with the performance data (e.g., performance metric, rendering performance and/or frame rate, etc.) received from client A 104a. In some examples, server A 106a may receive performance data corresponding to a period of time and may determine an application that was running in the foreground in the period of time. Server A 106a may add an application identifier to the performance data indicating the foreground application(s) corresponding to the period of time. For instance, the performance data may indicate a frame rate for the foreground application with a particular application identifier (e.g., application name and/or version number, etc.). Server A 106a may send the performance data (e.g., a frame rate with an associated application identifier) to the broker 102.

In some approaches, the servers 106a-b may measure remote desktop performance. For example, server A 106a may determine a frame rate of a remote desktop video stream. For instance, server A 106a may measure how frequently frames for the remote desktop video stream are being rendered by obtaining rendering information from hardware (e.g., processor(s), central processing unit (CPU), and/or graphics processing unit (GPU), etc.) and/or from a program (e.g., operating system (OS), video rendering program, and/or remote desktop client application, etc.) running on server A 106a. Server A 106a may send the performance data (e.g., rendering performance, and/or frame rate, etc.) to the broker 102.

The broker 102 (e.g., performance-based brokering 110) may receive the performance data from the servers 106a-c. In some examples, the broker 102 may aggregate the performance data on an application basis and/or on a server basis. For example, the broker 102 may average the performance data for each application executed on each server. In some approaches, the broker 102 may build a list of applications with corresponding average rendering performance (e.g., average frame rate). Accordingly, the broker 102 may obtain an average rendering performance for each application as executed on each server.

In some examples, the broker 102 may perform averaging of performance data per client, per subnet, and/or for all clients. For instance, the broker 102 may determine (e.g., calculate, compute, etc.) an average rendering performance with rendering performance (e.g., frame rate) for any or all client(s) 104a-c that have accessed the application over remote desktop. This may indicate a general rendering performance for an application on a server with respect to all clients. Additionally or alternatively, the broker 102 may determine (e.g., calculate, compute, etc.) an average rendering performance with rendering performance (e.g., frame rate) for subnets of client(s) 104a-c that have accessed the application over remote desktop. This may indicate a rendering performance for an application on a server with respect to each subnet. Additionally or alternatively, the broker 102 may determine (e.g., calculate, compute, etc.) an average rendering performance with rendering performance (e.g., frame rate) for each individual client 104a-c that has accessed the application over remote desktop. This may indicate a specific performance for an application on a server with respect to one client.

The broker 102 may establish a connection with a client. For example, client A 104a may request a remote desktop connection 108 via the broker 102.

The broker 102 may receive an indication of a selected application (e.g., application name, application identifier, application number, and/or code, etc.) from a client. For example, client A 104a may send an indication of an application for use by client A 104a. In some examples, the broker 102 may send a list of available applications to a client upon establishing a connection with a client. For instance, client A 104a may send a remote desktop connection request to the broker 102. The broker 102 may send an indication of a set (e.g., a list) of available applications (e.g., applications that may be provided by the server(s) 106a-c). Client A 104a may select an available application (based on user input, for example) and may send an indication of the selected application to the broker 102.

The broker 102 may direct a client to at least one of the servers 106a-c based on the performance data and the selected application(s). For example, the broker 102 (e.g., performance-based brokering 110) may determine one of the servers 106*a-c* for providing the selected application(s) based on the performance data.

In some approaches, the broker 102 may send a ranked set of servers to a client based on the performance data. For example, the broker 102 may send a ranked list to client A 104*a* that indicates a number of the top performing servers (e.g., top three servers) for the application(s) according to the performance data (e.g., rendering performance and/or frame rate). In some examples, a client may send a server selection to the broker 102, which the broker 102 may utilize to establish a remote desktop connection. Alternatively, the client may select a server (from the ranked set) and establish a remote desktop connection with the selected server independently (without sending the server selection to the broker 102, for example).

In some approaches, the broker 102 may automatically assign a server to a client based on the performance data. For example, the broker 102 may select a server and/or send the server selection to the client, which may be used to establish a remote desktop connection with the selected server.

As can be observed, performance-based brokering 110 may ameliorate some of the issues described above. For example, application-based performance metrics may be utilized to automate server selecting procedures and/or to present information to a client to enable informed server (e.g., remote desktop) selection. For example, if computationally demanding applications are to be used via remote desktop, the broker 102 may suggest those remote servers that have previously provided good performance when running those applications.

Figure 2:
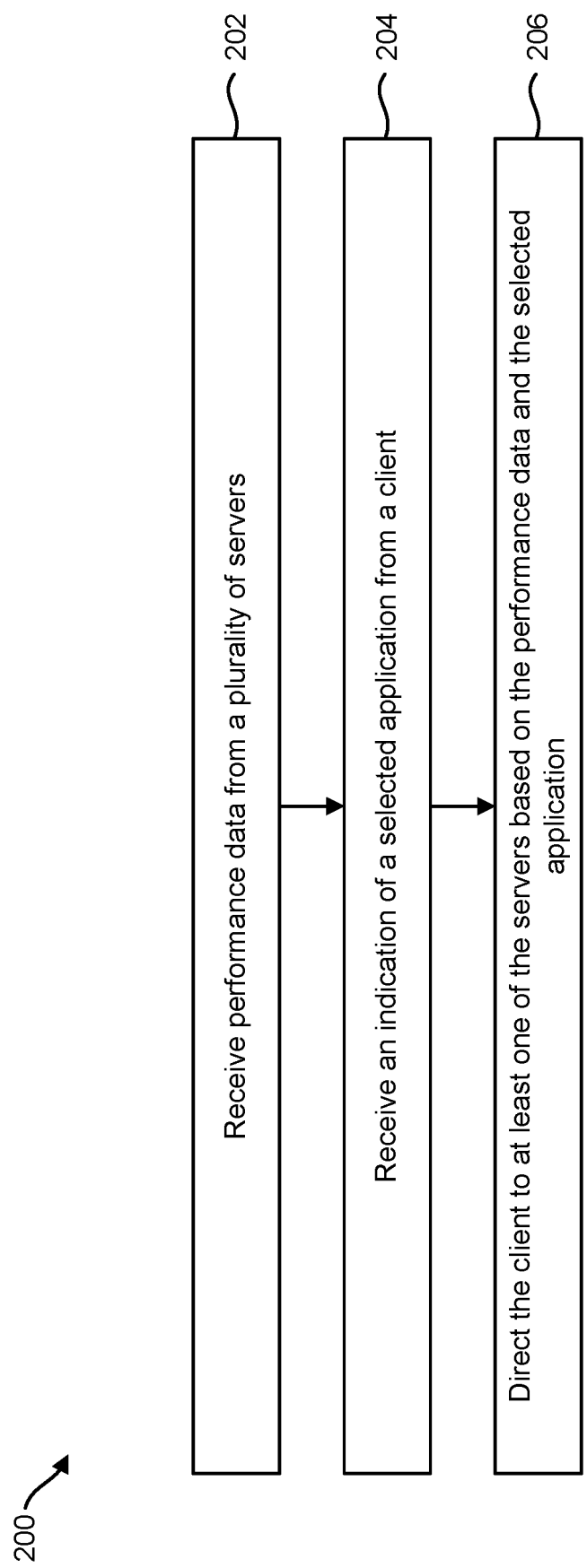
FIG. 2 is a flow diagram illustrating an example of a method for brokering servers based on remote access performance.

FIG. 2 is a flow diagram illustrating an example of a method 200 for brokering servers based on remote access performance. The method 200 may be performed by, for example, the broker 102 described in connection with FIG. 1 (and/or by the broker 302 described in connection with FIG. 3). The broker 102 may receive 202 performance data from a plurality of servers. This may be accomplished as described in connection with FIG. 1. For example, a plurality of servers 106*a-c* may determine performance data and/or may collect performance data from the clients 104*a-c*. The servers 106*a-c* may send the performance data to the broker 102. For instance, servers 106*a-c* may periodically collect performance data and may bind the performance data to the application(s) being executed at the time.

The broker 102 may receive 204 an indication of a selected application from a client (e.g., client A 104*a*). This may be accomplished as described in connection with FIG. 1. For example, the broker 102 may send a list of available applications to a client. The list may be sent upon establishing a connection with the client and/or in response to receiving a request for a remote desktop connection from the client. The broker 102 may then receive 204 an indication (e.g., name, number, and/or code, etc.) of a selected application from the client. In another example, the broker 102 may receive 204 an indication of a selected application from a client (without first sending a list of available applications, for instance).

The broker 102 may direct 206 the client to at least one of the servers 106*a-c* based on the performance data and the selected application. This may be accomplished as described in connection with FIG. 1. For example, the broker 102 may determine a ranking of server(s) 106*a-c* (e.g., available servers) based on the performance data (e.g., performance metrics, rendering performance, and/or frame rate). The broker 102 may send an indication (e.g., name, number, and/or code, etc.) of the server(s) (e.g., server identifiers) to the client in some examples. For instance, the broker 102 may suggest a list of servers for remote access. In some approaches, the broker 102 may receive a server selection, which the broker 102 may utilize to set up a remote desktop connection between the client and the selected server. In other approaches, the client may set up a remote desktop connection with the selected server independently from the broker 102.

Figure 3:
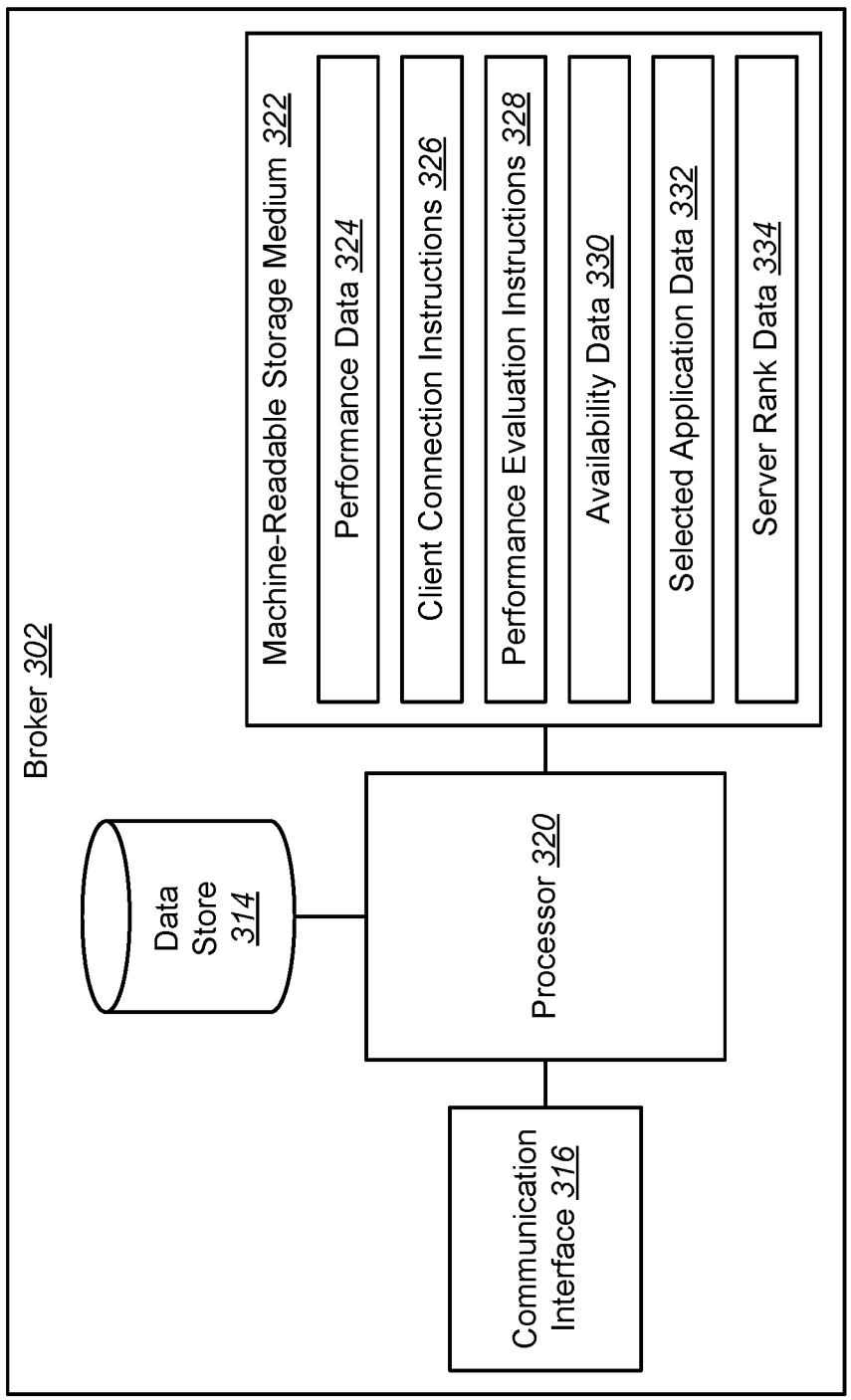
FIG. 3 is a block diagram of an example of a broker that may be implemented to broker servers based on remote access performance.

FIG. 3 is a block diagram of an example of a broker 302 that may be implemented to broker servers based on remote access performance. The broker 302 may be a computing device, such as a personal computer, a server computer, a tablet computer, etc. The broker 302 may include a processor 320, a data store 314, a machine-readable storage medium 322, and/or a communication interface 316. The broker 302 may be an example of the broker 102 described in connection with FIG. 1 in some implementations. For instance, the processor 320 and/or the machine-readable storage medium 322 may implement the performance based brokering 110 described in connection with FIG. 1. The broker 302 may include additional components (not shown) and/or some of the components described herein may be removed and/or modified without departing from the scope of this disclosure.

The processor 320 may be any of a central processing unit (CPU), a semiconductor-based microprocessor, graphics processing unit (GPU), FPGA, an application-specific integrated circuit (ASIC), and/or other hardware device suitable for retrieval and execution of instructions stored in the machine-readable storage medium 322. The processor 320 may fetch, decode, and/or execute instructions (e.g., client connection instructions 326 and/or performance evaluation instructions 328) stored on the machine-readable storage medium 322. Additionally or alternatively, the processor 320 may include electronic circuits that include electronic components for performing functionalities of the instructions (e.g., client connection instructions 326 and/or performance evaluation instructions 328). It should be noted that the processor 320 may be configured to perform any of the functions, operations, steps, methods, etc., described in connection with FIGS. 1-2 and/or 4-7 in some examples.

The machine-readable storage medium 322 may be any electronic, magnetic, optical, or other physical storage device that contains or stores electronic information (e.g., instructions and/or data). Thus, the machine-readable storage medium 322 may be, for example, RAM, EEPROM, a storage device, flash memory, an optical disc, and the like. In some implementations, the machine-readable storage medium 322 may be a non-transitory machine-readable storage medium, where the term "non-transitory" does not encompass transitory propagating signals.

The broker 302 may also include a data store 314 on which the processor 320 may store information. The data store 314 may be volatile and/or non-volatile memory, such as DRAM, EEPROM, magnetoresistive random-access memory (MRAM), phase change RAM (PCRAM), memristor, flash memory, and the like. In some examples, the machine-readable storage medium 322 may be included in the data store 314. Alternatively, the machine-readable storage medium 322 may be separate from the data store 314. In some approaches, the data store 314 may store similar instructions and/or data as that stored by the machine-readable storage medium 322. For example, the data store 314 may be non-volatile memory and the machine-readable storage medium 322 may be volatile memory.

The broker 302 may further include a communication interface 316. The broker 302 (e.g., processor 320) may communicate with external devices (not shown) using the communication interface 316. For example, the broker 302 may utilize the communication interface 316 to communicate with clients and/or servers. The communication interface 316 may include hardware and/or machine-readable instructions to enable the processor 320 to communicate with the external device(s). The communication interface 316 may enable a wired or wireless connection to the external device(s). For example, the communication interface 316 may include and/or may be coupled to a network interface card, communication ports, and/or a wireless modem, etc., to communicate with clients and/or servers. The communication interface 316 may be utilized to transmit and/or receive information (e.g., performance data, requests, indicators, lists of available applications, lists of servers, remote desktop connection information, streams, binary information, packets, and/or messages, etc.).

In some implementations, the broker 302 may communicate with various input and/or output devices, such as a keyboard, a mouse, a display, another apparatus, electronic device, computing device, etc., through which a user may input instructions into the broker 302.

The machine-readable storage medium 322 may store performance data 324. The performance data 324 may be received from multiple servers. In some examples, the performance data 324 may include performance metrics (e.g., rendering performance and/or frame rates), associated application identifiers, and/or associated server identifiers. The performance data 324 may include client identifiers and/or subnet identifiers in some examples. In some approaches, the performance data 324 may include performance metric samples and/or performance metric averages. For instance, the broker 302 may receive samples of frame rates corresponding to particular applications and servers (and/or clients and/or subnets) over time. The samples may be averaged and/or may be combined with previously computed averages to produce averaged performance metrics (e.g., average rendering performance and/or average frame rate). In some examples, performance metric averages (e.g., average rendering performance and/or average frame rate) may be computed and/or stored for a particular client, for subnets, and/or for all clients. In some examples, the performance data 324 may be a performance database. The broker may update the performance database based on received performance data.

The processor 320 may execute the client connection instructions 326 to establish a connection with a client. In some examples, the client connection instructions 326 may be executed to authenticate a client. Additionally or alternatively, the client connection instructions 326 may be executed to set up a remote desktop connection between a client and a server. For instance, once a client has provided valid credentials (e.g., username and password), the broker 302 may communicate with the client to broker a server (e.g., remote desktop connection) for the client.

The processor 320 may execute the performance evaluation instructions 328 to evaluate (e.g., average, rank, etc.) the performance data 324. For example, when performance data is received from a server, the performance evaluation instructions 328 may be executed to average performance metrics for an application and/or to rank servers based on the average performance metrics (e.g., average rendering performance and/or average frame rate, etc.). In some approaches, the processor 320 may compute multiple types (e.g., scopes, levels, etc.) of averages. For example, the processor 320 may compute performance metric averages per client (e.g., for each individual client), per subnet (e.g., for each subnet), and/or for all clients (e.g., for all clients that have accessed an application on a server). The averages may be computed for each application relative to each server.

Average frame rate is an example of an average performance metric. Equations (1)-(3) provide examples of approaches for determining average frame rates for all clients that have accessed an application on a server, for an individual client that has accessed an application on a server, and for a subnet of a number of clients that have accessed an application on a server. Averages of other performance metrics may be determined in some approaches.

Equation (1) illustrates an approach for determining an average frame rate for all clients (e.g., any client(s)) that have accessed an application on a particular server.

$$\text{Frame\_Rate\_Avg}_{i,j} = \frac{\sum_{n=1}^{N} \text{Frame\_Rate}_n}{N} \quad (1)$$

In Equation (1), Frame_Rate_Avg$_{i,j}$ is the average frame rate for server i and application j (over all clients), Frame_Rate$_n$ is the n-th frame rate measurement corresponding to application j on server i, and N is a number of frame rate measurements (from any client that has accessed application j on server i).

Equation (2) illustrates an approach for determining an average frame rate for an individual client that has accessed an application on a particular server.

$$\text{Frame\_Rate\_Avg}_{i,j,k} = \frac{\sum_{m=1}^{M} \text{Frame\_Rate}_m}{M} \quad (2)$$

In Equation (2), Frame_Rate_Avg$_{i,j,k}$ is the average frame rate for server i, application j, and client k, Frame_Rate$_m$ is the m-th frame rate measurement corresponding to client k accessing application j on server i, and M is a number of frame rate measurements from client k when accessing application j on server i.

Equation (3) illustrates an approach for determining an average frame rate for a subnet of clients that have accessed an application on a particular server.

$$\text{Frame\_Rate\_Avg}_{i,j,s} = \frac{\sum_{p=1}^{P} \text{Frame\_Rate}_p}{P} \quad (3)$$

In Equation (3), Frame_Rate_Avg$_{i,j,s}$ is the average frame rate for server i, application j, and subnet s, Frame_Rate$_p$ is the p-th frame rate measurement corresponding to any client in subnet s accessing application j on server i, and P is a number of frame rate measurements from any client(s) in subnet s when accessing application j on server i.

In some approaches, the processor 320 may execute the performance evaluation instructions 328 to rank servers based on the performance data (e.g., average performance metrics). For example, the processor 320 may rank each server based on performance metrics, where the highest rank may be assigned to a server with the highest performance metric and descending ranks may be assigned to other servers in descending order of performance metric. The resulting server ranking may be stored as server rank data 334 in the machine-readable storage medium.

In some examples, the processor 320 may rank the servers on a per-client basis, a per-subnet basis, and/or on an all-client basis. For instance, the processor 320 may produce a separate ranking for each individual client based on the performance data for applications executed on servers relative to each client. Additionally or alternatively, the processor 320 may produce a separate ranking for each subnet based on the performance data for applications executed on servers relative to each subnet. Additionally or alternatively, the processor 320 may produce a general ranking for all clients based on the performance data for applications executed on servers for any client.

In some examples, the processor 320 may rank the servers conditionally on one basis or multiple bases (e.g., per-client basis, per-subnet basis, and/or all-client basis). For example, a ranking may be produced for each client depending on the source of available performance data. For instance, if performance data for an application relative to an individual client is available, then the ranking may be based on the performance data relative to that client. If individual client performance data is not available, then the ranking may be based on performance data relative to a subnet that includes the client. If subnet performance data is not available, then the ranking may be based on performance data relative to any client.

In some examples, the processor 320 may rank the servers based on a weighting function depending on the source of performance data. For example, the processor 320 may weight performance data (e.g., performance metrics) and/or rankings relative to each client. For instance, performance data from a specific client may be given a greatest weight in determining the ranking, performance data from other client(s) in the same subnet of the specific client may be given less weight, and/or performance data from other client(s) outside of the subnet may be given even less weight in determining a server ranking for a specific client.

The broker 302 (e.g., the processor 320 through the communication interface 316) may receive a connection request (e.g., a request to connect with the broker 302 and/or a request for a remote desktop connection with a server) from a client. The broker 302 (e.g., the processor 320 through the communication interface 316) may send a set (e.g., list) of available applications. The set of available applications may include applications that may be executed by server(s) for a remote desktop connection.

In some examples, the machine-readable storage medium 322 may store availability data 330. The availability data 330 may indicate server and/or application availability. In some approaches, the broker 302 may request application availability from servers. Each server may respond with availability data 330 indicating installed applications that may be accessed via a remote desktop connection. In some approaches, the broker 302 may request server availability from the servers. Each server may respond with availability data 330 indicating whether the server is occupied (e.g., already hosting a remote desktop connection and/or otherwise unable to provide a new remote desktop connection). In some approaches, the broker 302 may generate server availability data by tracking any ongoing remote desktop connections.

The broker 302 (e.g., the processor 320 through the communication interface 316) may receive selected application data 332 from clients. The selected application data 332 may be stored in the machine-readable storage medium. The selected application data 332 may indicate applications selected by a client (based on user input, for example).

The broker 302 (e.g., the processor 320 through the communication interface 316) may send an indication of a set of servers (e.g., server identifiers) based on the selected application(s). For example, the broker 302 may read and send a portion of the server rank data 334 based on the selected application(s). For instance, the broker 302 may send a ranked list of available servers corresponding to the selected application(s). For instance, the broker 302 may send server identifiers to the client, where at least one of the server identifiers identifies one of the servers with a highest average rendering performance for the selected application. In some approaches, the ranking may be relative to the specific requesting client, relative to a subnet of the client, and/or general to all clients.

In some examples, the broker 302 may also send performance data 324 (e.g., averaged performance metrics) corresponding to the indication of the set of servers. For instance, the broker 302 may send an average frame rate for a selected application for each of the set of servers.

In some cases, multiple applications may be selected. In some approaches, the broker 302 may send an indication of a ranked set of servers for each application. In some approaches, the broker 302 may send an indication of a ranked set of servers with performance metrics for each selected application. In some approaches, the broker 302 may send an indication of a ranked set of servers, where the ranking is based on an average performance metric of all selected applications. Other approaches may be used.

In some examples, the broker 302 (e.g., the processor 320 through the communication interface 316) may receive an indication of a selected server from a client. The broker 302 may set up a remote desktop connection between the client and the selected server. In some examples, the broker 302 may send information to the client and/or to the selected server to assist in setting up the remote desktop connection. In some examples, the client and the selected server may set up the remote desktop connection independently of the broker 302. For instance, a client may utilize the indication of the set of servers to select a server and set up the remote desktop connection without further action from the broker 302.

Figure 4:
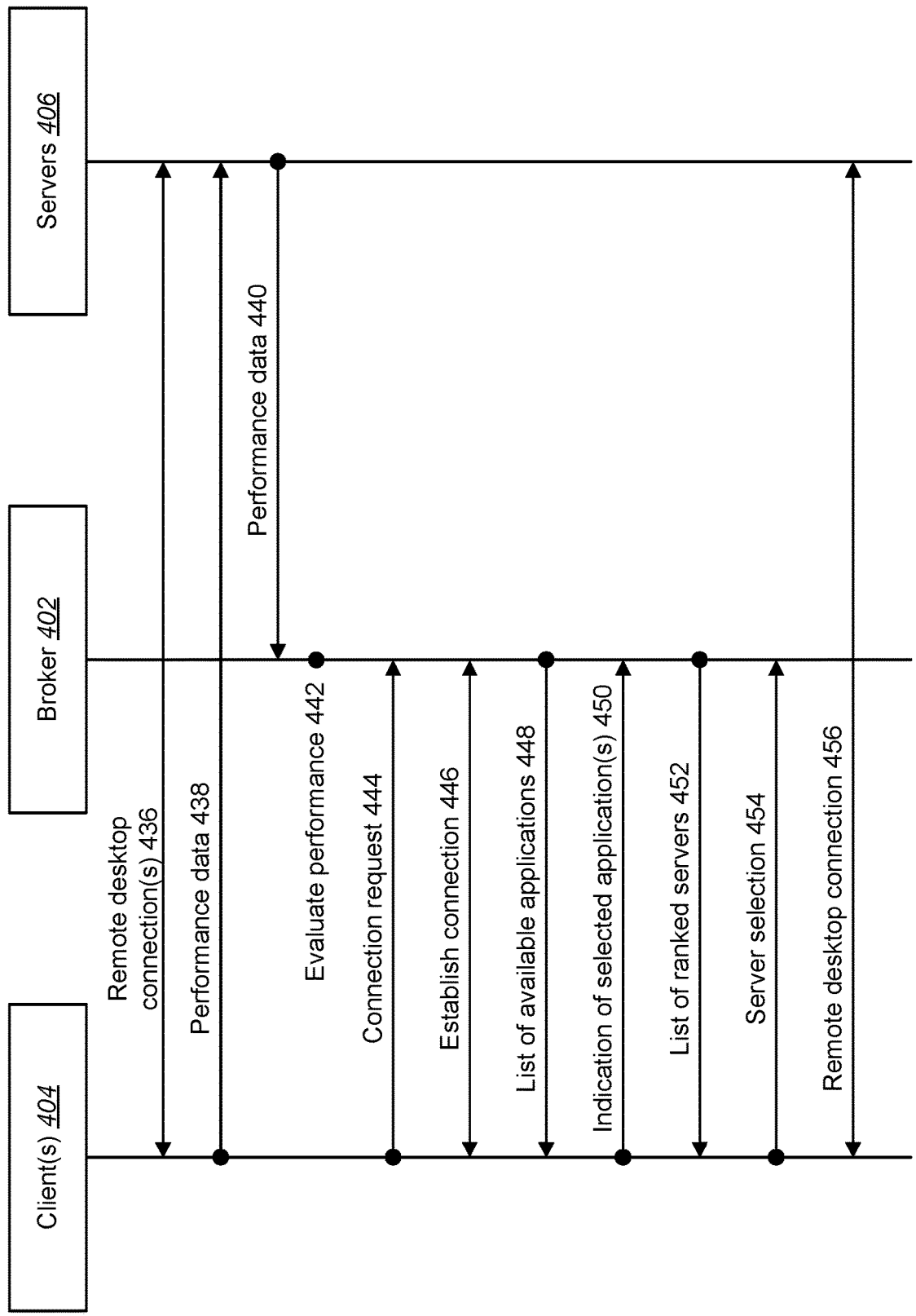
FIG. 4 is a thread diagram illustrating an example of procedures for brokering servers based on remote access performance.

FIG. 4 is a thread diagram illustrating an example of procedures for brokering servers based on remote access performance. In particular, FIG. 4 illustrates client(s) 404, a broker 402, and servers 406. The client(s) 404 may be examples of the clients (e.g., clients 104*a-c*) described in connection with FIGS. 1-3. The broker 402 may be an example of the brokers 102, 302 described in connection with FIGS. 1-3. The servers 406 may be examples of the servers (e.g., servers 106*a-c*) described in connection with of FIGS. 1-3.

As illustrated in the example of FIG. 4, remote desktop connection(s) 436 may be established between the servers 406 and client(s) 404. Based on the remote desktop connection(s) 436, the client(s) 404 may send performance data 438 (e.g., performance metric(s), rendering performance, and/or frame rates, etc.) to the servers 406. The servers 406 may send the performance data 440 to the broker 402. For example, the servers 406 may collect application-based performance data (e.g., server IP address or hostname, application name, and FPS) and send the performance data 440 to the broker 402.

Based on the performance data 440, the broker 402 may evaluate 442 performance. For example, the broker 402 may aggregate (e.g., collect and/or average, etc.) the performance data 440 (e.g., performance metrics) and/or may rank the servers 406 based on the performance data 440. For example, the broker 402 may enable the client 404 to connect to the server 406 that will have the best performance for client use. For instance, the servers 406 may periodically collect remote desktop video stream frames per second (FPS) and may bind the information to a foreground application identifier. This information may be sent to the broker 402. The broker 402 may use this information to build a list of applications and their average FPS for each server. In some examples, each time the broker 402 receives more performance data from a server 406, this list may be updated.

A client 404 may send a connection request 444 to the broker 402. The broker 402 may establish a connection 446 with the client 404. For example, the broker 402 may authenticate the client 404.

The broker 402 may send a list of available applications 448. For example, the broker 402 may send a list of applications installed on the servers 406 that are currently available.

The client 404 may send an indication of selected application(s) 450. For example, the client 404 may present the list of available applications 448 to a user (on a display and/or through audio (e.g., speech), etc.). The client 404 may receive an input (e.g., mouse click, touch, tap, button press, speech command, motion, and/or gesture, etc.) indicating selected application(s). The indication of selected application(s) 450 may then be sent to the broker 402.

The broker 402 may send a list of ranked servers 452 to the client 404. For example, the broker 402 may send the performance data (including a hostname, for instance) for top scoring servers 406 for the selected application. The client 404 may send a server selection 454 to the broker 402 based on the list of ranked servers 452. For example, the client 404 may receive an input (e.g., mouse click, touch, tap, button press, speech command, motion, and/or gesture, etc.) indicating a selected server. The client 404 may send the server selection 454 to the broker 402. The broker 402 may establish a remote desktop connection 456 between the client and the selected server 406. For example, the client 404 may connect to the selected server 406.

Figure 5:
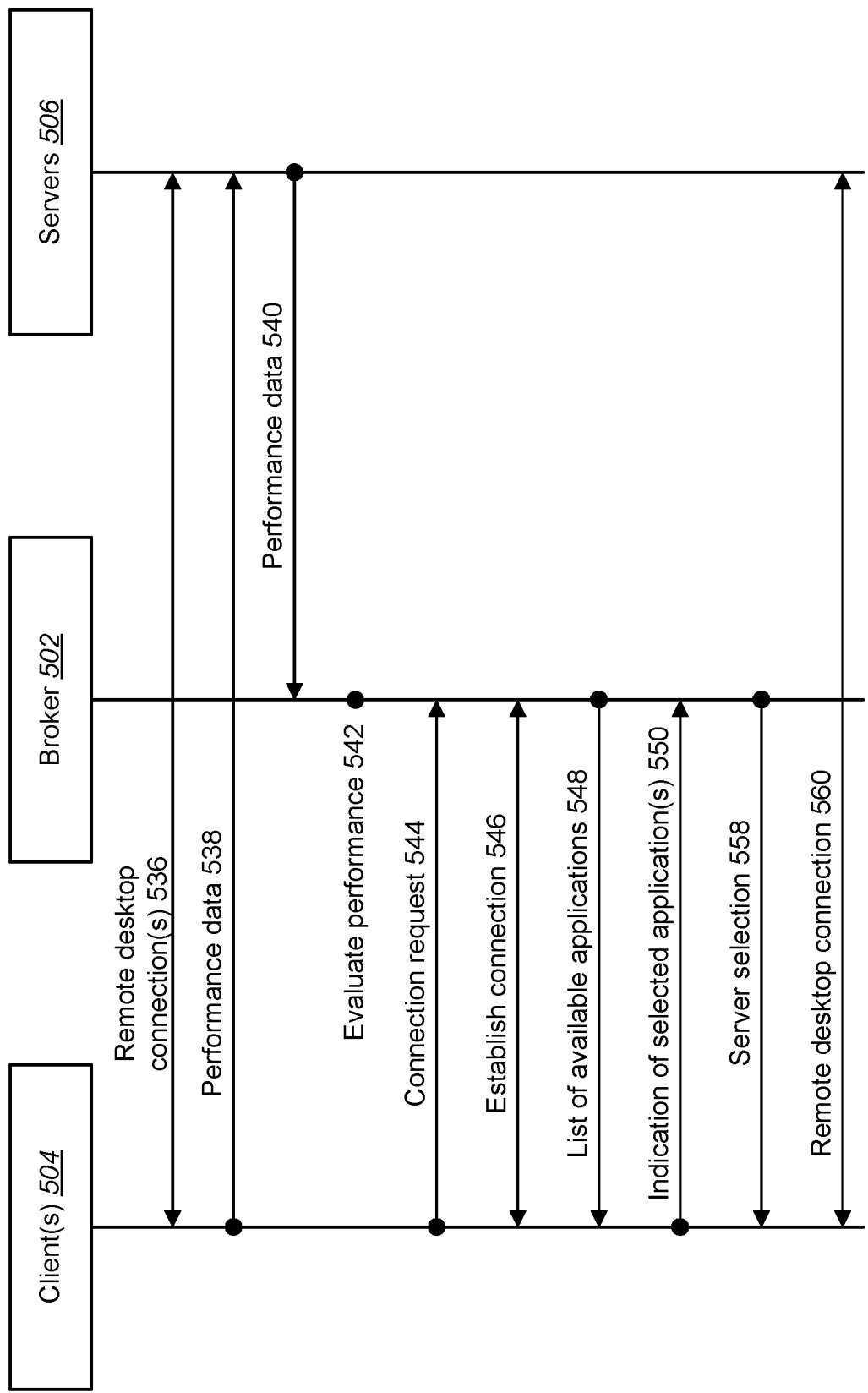
FIG. 5 is a thread diagram illustrating another example of procedures for brokering servers based on remote access performance.

FIG. 5 is a thread diagram illustrating another example of procedures for brokering servers based on remote access performance. In particular, FIG. 5 illustrates client(s) 504, a broker 502, and servers 506. The client(s) 504 may be examples of the clients (e.g., clients 104a-c) described in connection with FIGS. 1-3. The broker 502 may be an example of the brokers 102, 302 described in connection with FIGS. 1-3. The servers 506 may be examples of the servers (e.g., servers 106a-c) described in connection with FIGS. 1-3.

As illustrated in the example of FIG. 5, remote desktop connection(s) 536 may be established between the servers 506 and client(s) 504. Based on the remote desktop connection(s) 536, the client(s) 504 may send performance data 538 (e.g., performance metric(s), rendering performance, and/or frame rates, etc.) to the servers 506. The servers 506 may send the performance data 540 to the broker 502.

Based on the performance data 540, the broker 502 may evaluate 542 performance. For example, the broker 502 may aggregate (e.g., average) the performance data 540 (e.g., performance metrics) and/or may rank the servers 506 based on the performance data 540.

A client 504 may send a connection request 544 to the broker 502. The broker 502 may establish a connection 546 with the client 504. For example, the broker 502 may authenticate the client 504.

The broker 502 may send a list of available applications 548. For example, the broker 502 may send a list of applications installed on the servers 506 that are currently available.

The client 504 may send an indication of selected application(s) 550. For example, the client 504 may present the list of available applications 548 to a user (on a display and/or through audio (e.g., speech), etc.). The client 504 may receive an input (e.g., mouse click, touch, tap, button press, speech command, motion, and/or gesture, etc.) indicating a selected application. The client 504 may send an indication of the selected application(s) 550 to the broker 502. In some approaches, the broker 502 may select a server 506 (e.g., the server with the best performance metrics for the application(s)) and may establish a remote desktop connection 560. Alternatively, the broker 502 may send the server selection 558 to the client 504, which may establish a remote desktop connection 560 between the client and the selected server 506.

It should be noted that although examples of procedures are illustrated in FIGS. 4 and 5 in particular orders, other orders may be implemented in accordance with this disclosure. In some examples, performance data may be collected, but performance may not be evaluated until after receiving an indication of selected application(s). In this way, the broker 402 may focus processing on server brokering for particular application(s). In some examples, remote desktop connections may be ongoing for a set of clients while performance data is received and/or while a server is selected for another client. Other orders are possible.

Figure 6:
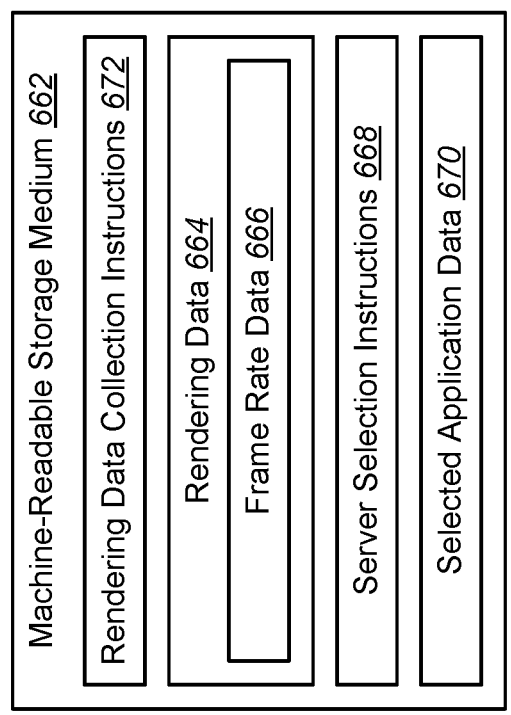
FIG. 6 is a block diagram illustrating an example of a machine-readable storage medium.

FIG. 6 is a block diagram illustrating an example of a machine-readable storage medium 662. Examples of the machine-readable storage medium 662 may include RAM, EEPROM, a storage device, an optical disc, and the like. In some implementations, the machine-readable storage medium 662 may be housed in a computing device or externally from a computing device. For example, the machine-readable storage medium 662 may be a solid-state drive (SSD) housed in a computing device or may be external flash memory that may be coupled to a computing device. In some implementations, the machine-readable storage medium 662 may be an example of the machine-readable storage medium 322 described in connection with FIG. 3. In some examples, the machine-readable storage medium 662 described in connection with FIG. 6 may be utilized instead of (e.g., in place of) the machine-readable storage medium 322 described in connection with FIG. 3. The machine-readable storage medium 662 may include code (e.g., instructions) that may be executed by processor(s) (e.g., a computing device).

The machine-readable storage medium 662 may include rendering data collection instructions 672. When executed, the rendering data collection instructions 672 may cause a computing device to collect rendering data 664 from a plurality of servers. For example, the rendering data collection instructions 672 may cause a computing device to request and/or receive rendering data 664 from servers. The rendering data 664 may be stored in the machine-readable storage medium 662.

The rendering data 664 may include at least one metric that indicates a rendering characteristic (e.g., rendering speed, rendering frequency, rendering quality, and/or rendering resolution, etc.). In some examples, the rendering data 664 includes frame rate data 666. The frame rate data 666 may indicate a frame rate of a foreground program executed by a server and streamed in video from the server over a remote desktop connection.

The machine-readable storage medium 662 may store selected application data 670. The selected application data 670 may indicate selected applications from a client. For example, the machine-readable storage medium 662 may receive selected application data 670 from a client.

The machine-readable storage medium 662 may include server selection instructions 668. When executed, the server selection instructions 668 may cause a computing device to select a server for a client based on the rendering data 664 and the selected application data 670. For instance, the computing device may execute the server selection instructions 668 to select a server corresponding to a selected application. In some approaches, the server selection instructions 668 may cause a computing device to automatically establish a remote desktop connection based on a selected server. In some approaches, the selected server may be sent to the client to establish the remote desktop connection.

Figure 7:
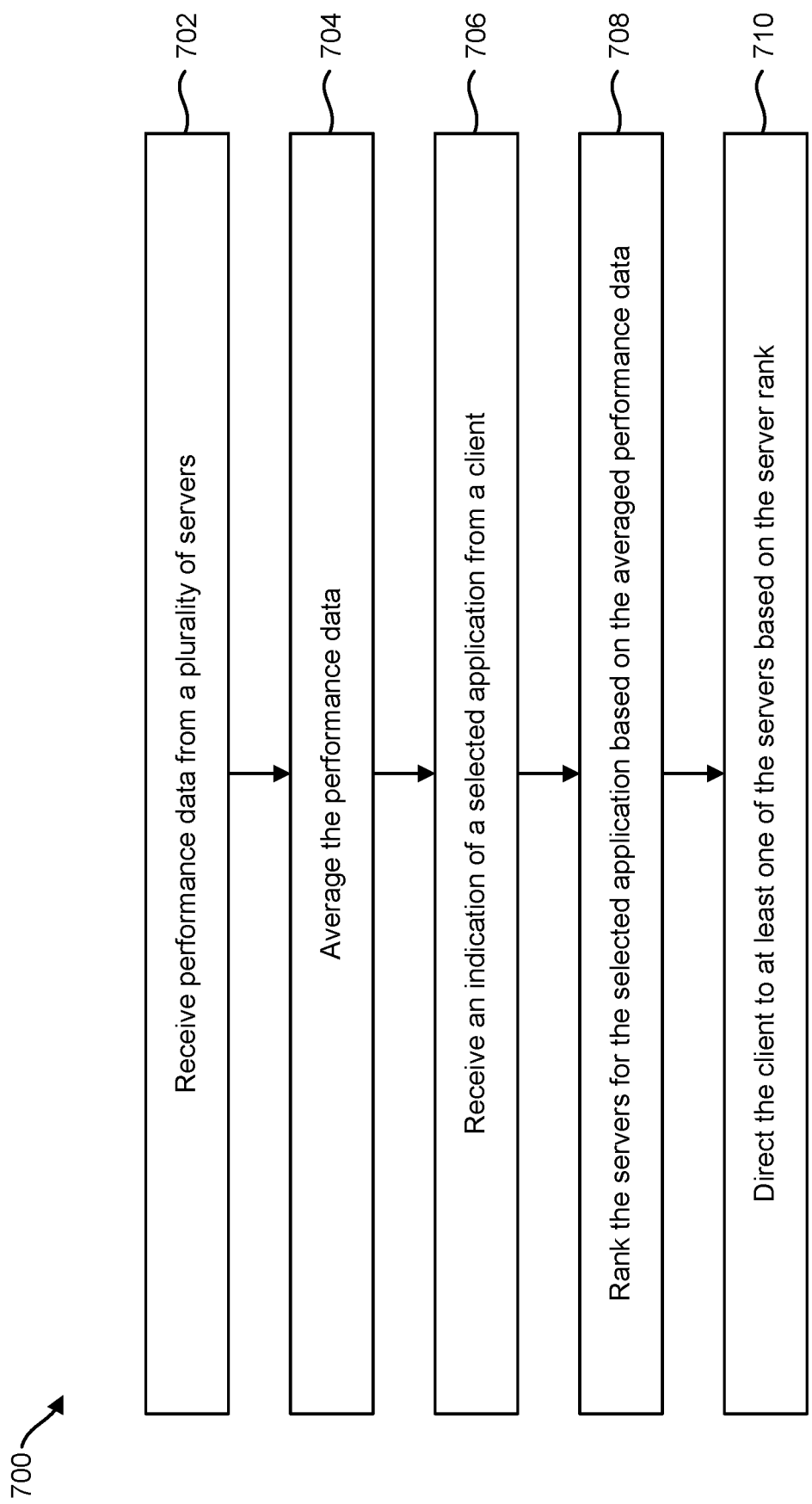
FIG. 7 is a flow diagram illustrating another example of a method for brokering servers based on remote access performance.

FIG. 7 is a flow diagram illustrating another example of a method 700 for brokering servers based on remote access performance. The method 700 may be performed by a computing device (e.g., broker). The computing device may receive 702 performance data from a plurality of servers. This may be accomplished as described in connection with FIGS. 1-6.

The computing device may average 704 the performance data (e.g., performance metrics). This may be accomplished as described in connection with FIGS. 1-6. For example, the computing device may average 704 the performance data per client, per subnet, and/or for all clients (e.g., any client(s) with performance data for an application).

The computing device may receive 706 an indication of a selected application from a client. This may be accomplished as described in connection with FIGS. 1-6.

The computing device may rank 708 the servers for the selected application based on the averaged performance data. This may be accomplished as described in connection with FIGS. 1-6.

The computing device may direct 710 the client to at least one of the servers based on the server rank. This may be accomplished as described in connection with FIGS. 1-6. For example, the computing device may send a ranked list of servers (e.g., server identifiers) to the client and/or may select a server for the client.

Figure 8:
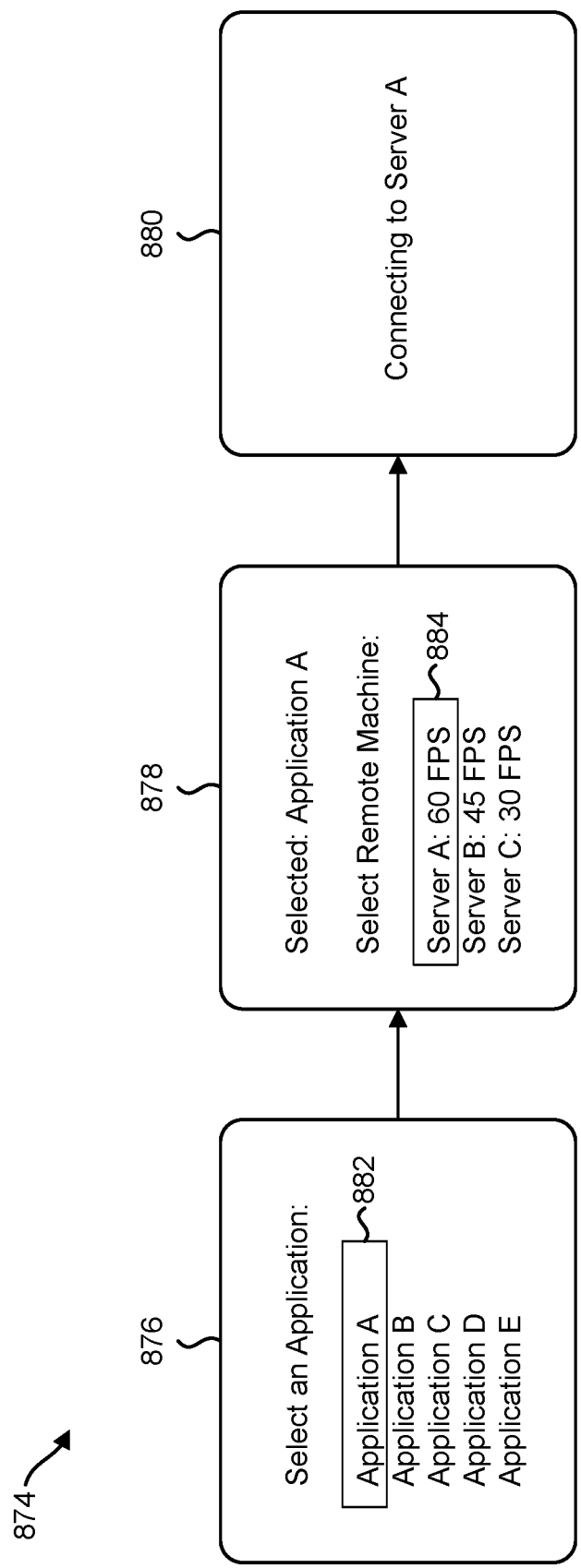
FIG. 8 is a diagram illustrating an example of a user interface that may be presented on a client.

FIG. 8 is a diagram illustrating an example of a user interface 874 that may be presented on a client. As illustrated in FIG. 8, when a client connects to a broker, the client may receive the list of all available applications 876 that were collected by the broker. The client may then select 882 an application for remote access (based on received user input, for example). After this selection is made, the client may receive and present a list of servers 878 that have a performance entry for that application. For example, upon selecting the application or applications, a list of servers 878 is filtered and remote desktops with top performance for the selected application(s) may be suggested to a user. This list of servers 878 may be ordered in such a way that servers with the best performance (in FPS, for example) are presented first. Each entry on this list may have the hostname and the average FPS for that application. When the client selects 884 a server in the list (based on received user input, for example), the client may be connected 880 to that server.

In some examples, a user may have a clear indication of which remote server may provide the best performance for the intended usage. The user may not need any prior knowledge about the remote server hardware or operational system. Additionally, a client may avoid connecting to a remote server that does not have the intended application.

It should be noted that the function(s), operation(s), procedure(s), step(s), structure(s), hardware, module(s), element(s), feature(s), etc., of at least one example and/or approach described herein may be combined with the function(s), operation(s), procedure(s), step(s), structure(s), hardware, module(s), element(s), feature(s), etc., of another example and/or approach without departing from the scope of the claims. Additionally or alternatively, the orders of functions, operations, procedures, steps, etc., may be interchanged and/or rearranged in some examples. Additionally or alternatively, the function(s), operation(s), procedure(s), step(s), etc., may be omitted in some examples.

The invention claimed is:

1. A method for brokering remote servers performed by a computing device, comprising:
   receiving performance data from a plurality of remote servers, wherein the performance data comprises a frame rate measured by a second client and indicates rendering performance of a foreground application executed by at least one of the remote servers and streamed from at least one of the remote servers over a remote desktop connection;
   receiving an indication of a selected application from a first client, wherein the computing device is a broker device that is an intermediary between the first client and the remote servers; and
   directing the first client to at least one of the remote servers based on the performance data measured by the second client and the selected application, wherein directing the first client to the at least one of the remote servers comprises sending to the first client a list of remote servers with the selected application, wherein the list is ranked based on an average rendering performance of the selected application, and wherein the average rendering performance is the average frame rate.

2. The method of claim 1, wherein directing the first client to the at least one of the remote servers further comprises sending a server identifier to the first client, wherein the server identifier identifies one of the remote servers with a highest average rendering performance for the selected application.

3. The method of claim 1, wherein the performance data further comprises a remote server identifier and an application identifier.

4. The method of claim 1, wherein the rendering performance is measured by at least one of the remote servers.

5. A computing device, comprising:
   a communication interface;
   a memory;
   a processor coupled to the memory, wherein the processor is to:
      aggregate performance data from a plurality of servers, wherein the performance data comprises a frame rate measured by a second client and indicates rendering performance of a foreground application executed by at least one of the servers and streamed from at least one of the servers over a remote desktop connection;
      establish a connection with a first client;
      send a list of applications available on the plurality of servers to the first client;

receive an indication of a selected application from the first client, wherein the computing device is a broker device that is an intermediary between the first client and the plurality of servers; and send a list of servers to the first client, wherein the list is ranked based on the performance data measured by the second client and based on an average rendering performance on the first client for the selected application, and wherein the average rendering performance is the average frame rate.

6. The computing device of claim 5, wherein the processor is to rank the list based on the performance data by further ranking the servers based on an average rendering performance for clients on a subnet of the first client for the selected application.

7. The computing device of claim 5, wherein the processor is to rank the list based on the performance data by further ranking the servers based on an average rendering performance for all clients for the selected application.

8. The computing device of claim 5, wherein the list of servers comprises an indication of servers on which the selected application is available.

9. A non-transitory tangible computer-readable medium storing executable code, comprising:

code to cause a computing device to collect rendering data from a plurality of servers, wherein the rendering data indicates a client frame rate measured by a second client of a foreground program executed by a server and streamed in video from the server over a remote desktop connection; and code to cause the computing device to select a server for a first client based on an average rendering performance measured by the second client of a selected application, wherein the computing device is a broker device that is an intermediary between the first client and the plurality of servers, and wherein the average rendering performance is the average frame rate.

* * * * *